United States Patent
Hauser et al.

(10) Patent No.: US 10,801,536 B2
(45) Date of Patent: Oct. 13, 2020

(54) DEFORMABLE BODY, AND SYSTEM COMPRISING A DEFORMABLE BODY AND AN ANTI-CREEPAGE RING

(71) Applicant: A. Raymond et Cie. SCS, Grenoble (FR)

(72) Inventors: Ingo Hauser, Kandern (DE); Axel Rhein, Steinen (DE); Davide Meola, Wehr (DE)

(73) Assignee: A. Raymond et Cie, Grenoble (FR)

( * ) Notice: Subject to any disclaimer, the term of this patent is extended or adjusted under 35 U.S.C. 154(b) by 124 days.

(21) Appl. No.: 15/579,203

(22) PCT Filed: Jun. 3, 2016

(86) PCT No.: PCT/EP2016/000913
§ 371 (c)(1),
(2) Date: Dec. 2, 2017

(87) PCT Pub. No.: WO2016/192856
PCT Pub. Date: Dec. 8, 2016

(65) Prior Publication Data
US 2018/0135672 A1    May 17, 2018

(30) Foreign Application Priority Data
Jun. 3, 2015  (DE) .......................... 10 2015 210308

(51) Int. Cl.
*F16B 5/02*    (2006.01)
(52) U.S. Cl.
CPC .............. *F16B 5/0241* (2013.01); *F16B 5/02* (2013.01)

(58) Field of Classification Search
CPC ........ F16B 5/0258; F16B 5/0241; F16B 5/43; F16B 5/001; F16B 43/001
(Continued)

(56) References Cited

U.S. PATENT DOCUMENTS 2,795,444 A * 6/1957 Nenzell ................... F16B 43/00
411/542
3,168,321 A * 2/1965 Glicksman ............ F16B 43/001
277/637
(Continued)

FOREIGN PATENT DOCUMENTS

DE     3000697       7/1980
DE     29920497 U1  2/2000
(Continued)

OTHER PUBLICATIONS

Machine assisted English translation of WO2001065128A1 obtained from https://patents.google.com on Nov. 12, 2019, 7 pages.
(Continued)

*Primary Examiner* — Flemming Saether
(74) *Attorney, Agent, or Firm* — Warner Norcross + Judd LLP

(57) ABSTRACT

The invention relates to a deformable body with a hole which is suitable for receiving an anti-creepage ring and a fastener, wherein the hole has a central axis and the hole is delimited by the deformable material which forms the deformable body, wherein the body comprises a deformable protruding ring which surrounds the hole and protrudes in the direction of the central axis and a projection which surrounds the hole and is arranged at a distance from the protruding the ring in a direction perpendicular to the central axis, and the ring protrudes beyond the projection in the direction of the central axis.

7 Claims, 3 Drawing Sheets

(58) Field of Classification Search
USPC .............................................. 411/546, 371.1
See application file for complete search history.

(56) References Cited

U.S. PATENT DOCUMENTS

| | | | | |
|---|---|---|---|---|
| 3,726,178 A | * | 4/1973 | Dimity .................. | F16B 43/001 |
| | | | | 411/371.1 |
| 4,238,165 A | | 12/1980 | Wagner | |
| 4,535,996 A | * | 8/1985 | Cardis .................... | F16J 15/127 |
| | | | | 277/313 |
| 4,975,008 A | * | 12/1990 | Wagner .................. | F02B 77/00 |
| | | | | 411/337 |
| 5,147,151 A | * | 9/1992 | Hipkins, Jr. ........ | E21D 21/0093 |
| | | | | 405/259.1 |
| 5,397,206 A | * | 3/1995 | Sihon .................... | F02B 77/005 |
| | | | | 411/369 |
| 5,700,017 A | * | 12/1997 | Tensor .................. | F16J 15/123 |
| | | | | 277/596 |
| 6,409,446 B1 | | 6/2002 | Schwarz | |
| 9,423,060 B2 | * | 8/2016 | Shinohara ............. | F16B 5/0241 |
| 2002/0131840 A1 | | 9/2002 | Szczukowski et al. | |

FOREIGN PATENT DOCUMENTS

| | | |
|---|---|---|
| DE | 10113044 A1 | 10/2002 |
| DE | 102005045630 | 4/2006 |
| DE | 202012007112 U1 | 8/2012 |
| WO | 200165128 A1 | 9/2001 |

OTHER PUBLICATIONS

Machine assisted English translation of DE202012007112U1 obtained from https://patents.google.com on Nov. 12, 2019, 7 pages.

* cited by examiner

DEFORMABLE BODY, AND SYSTEM COMPRISING A DEFORMABLE BODY AND AN ANTI-CREEPAGE RING

TECHNICAL FIELD OF THE INVENTION

The invention relates to a deformable body with a hole which is suitable for receiving an anti-creepage ring and a fastener, wherein the hole has a central axis and the hole is delimited by the deformable material which forms the deformable body. Furthermore, the invention relates to a system with a deformable body and an anti-creepage ring, wherein the body has a hole which receives the anti-creepage ring, wherein the hole has a central axis and extends through the deformable body from an end of the deformable body which receives the anti-creepage ring to a distal end of the deformable body, wherein the hole is delimited by the deformable material which forms the deformable body.

BACKGROUND OF THE INVENTION

It is known to hold a support part by means of a fastener which can be designed as a screw, wherein, on one side of the support part, a counter-piece in the form of a nut, for example, is arranged, and on the other side, a washer or an anti-creepage ring extending into the hole is provided. Between the support element and the anti-creepage ring, a deformable body forming a hole can be provided.

It has been found that increased demands apply to the actual clamping force that can be applied in particular by the screw. Therefore, it is desirable to improve the clamping force.

BRIEF SUMMARY OF THE INVENTION

Therefore, the aim of the invention is to improve the clamping force for clamping an element.

The aim is achieved by the subject matter of the coordinate claims. Advantageous embodiments are indicated in the dependent claims and in the following description.

The invention is based on the fundamental idea of providing a special geometry of a deformable body, by means of which the actual clamping force can be improved. Here, the deformable body can be arranged between a support part and the anti-creepage ring, and it has a support for the anti-creepage ring, which can be deformed during the initial fastening of the fastener to the support element. The deformable support can here be deformed on a projection formed by the deformable body in the direction of the connecting axis or longitudinal axis of the fastener and, after the deformation, it can rest on the projection formed by the deformable body.

As a result, it is possible to reduce the creepage behavior in the fastened state. The spatial geometry by means of which the effect according to the invention can be achieved requires only a slight modification of a deformable body, which has a positive effect both on the production and also on the associated costs. Furthermore, the long-term stability is improved. By means of the geometry provided, a predetermined clamping force can be maintained for a long time.

The invention creates a deformable body with a hole which is suitable for receiving an anti-creepage ring and a fastener, wherein the hole has a central axis and the hole is delimited by the deformable material which forms the deformable body. The deformable body has a deformable protruding ring which surrounds the hole and protrudes in the direction of the central axis. Furthermore, the deformable body has a projection which surrounds the hole and which is arranged at a distance from the protruding ring in a direction perpendicular to the central axis. The ring protrudes beyond the projection in the direction of the central axis. At least locally in the area of the ring formed on the projection, the ring with its upper delimitation has a higher level than the projection with its upper delimitation.

In the sense of the invention, the term "fastener" includes fasteners by means of which, in particular, pretensioning forces that are greater than approximately 1000 N can be generated or applied. In particular, in the case of a fastener which comprises a screw and optionally a nut, said fastener can be of metric design. However, other screw types are also possible. In particular, screw sizes in the range from M5 to M8 can be provided; smaller sizes, in particular M4, and larger sizes, in particular M10 to M12, are also possible.

In the sense of the invention, the term "anti-creepage ring" also includes a washer. On the washer, elements can be molded, which, for example, can increase the friction with an element in contact with the washer, in particular with the deformable body. Elements molded on the anti-creepage ring can be used as catch mechanism during pre-installation and for securing against rotation.

In the sense of the invention, the term "deformable" includes deformation of the material in the case of a force application, which, typically in the field of the invention, occurs particularly during the tightening of a screw. The deformation can be a plastic deformation; alternatively, an elastic deformation or a mixed form can be provided. The force levels that occur here during the fastening of the fasteners, in particular for screws M5, M6, M8, are in the range from approximately 2000 N to approximately 20,000 N. With larger screws, M10 and M12, higher forces up to 35 kN and 50 kN, respectively, are possible. Typically, PA, PP or POM is used as material for the deformable body or the deformable body comprises said material. A glass fiber additive in the materials is possible. A deformable body in the sense of the invention preferably has an elastic modulus in the range from approximately 1000 MPa to approximately 9000 MPa.

In the sense of the invention, the term "ring" includes an annular assemblage of elevations, which can be designed in the form of a circle or ellipse, in particular. The annular assemblage can also be formed as a closed linear element, designed, in particular, to be symmetric about the central axis of the hole. Generalized polygons are possible. The annular assemblage has substantially the same height along the elevation(s).

In particular, the deformable protruding ring which surrounds the hole and protrudes in the direction of the central axis is suitable for being initially deformed by the fastener in the case of force application. The ring first absorbs some of the fastening force applied. For example, the ring can first absorb a fastening force, in particular, a screwing force in the case of a fastener designed as a screw, in particular until the anti-creepage ring and the support element are in contact with one another. Here, the invention makes use of the fact that less force is absorbed with the ring provided than, for example, with large-surface-designed element, as a result of which a considerable reduction of plastic creep over the life cycle can be achieved. In particular, the ratio of ring surface to anti-creepage ring plate surface can be in the range from approximately 5% to 20%, preferably from approximately 5% to approximately 15%, most particularly preferably from approximately 7% to approximately 13%. In a preferred embodiment, the ratio is approximately 10%.

In an area in which the anti-creepage ring does not come in contact with the deformable body, the projection surrounding the hole can protrude beyond the ring, so that, with respect to the anti-creepage ring, the deformable body can comprise a section which protrudes beyond the ring. This additional ring then has no influence on the functionality of the deformable protruding ring, since this additional ring is arranged outside of the anti-creepage ring which comes in contact with the deformable body.

A recess is provided between the ring and the projection, so that at least a portion of the ring can be deformed into the recess or onto the recess towards or into a position in which it hangs over the recess. Preferably, the recess is designed in such a manner that at least the tip of the ring can be deformed into the recess or onto the recess towards or into a position in which it hangs over the recess. For example, a portion of the ring, preferably the tip of the ring, can be designed so that it curls into the recess or onto the recess towards or into a position in which it hangs over the recess. In a predetermined area, the ring can be deformed on the deformable body and at least partially come in contact with the projection of the deformable body. A deformation characteristic can be set, which is substantially dependent on the material of the ring and on the geometric shape of the ring. In a preferred embodiment, the recess surrounds the ring. In a preferred embodiment, in at least one of the possible directions, the size of the recess radially with respect to the longitudinal axis of the hole is more than 0.5 times, particularly preferably more than 0.75 times, preferably equal to and most particularly more than 1.25 times the thickness of the ring in this direction. In a preferred embodiment, the size of the recess in all the possible directions radially with respect to the longitudinal axis of the axis of the hole is more than 0.5 times, particularly preferably more than 0.75 times, preferably equal to and most particularly more than 1.25 times the thickness of the ring in this direction.

In a preferred embodiment, the ring has a tapering cross section in the plane which contains the central axis. By means of the tapering cross section, a deformation of the ring can be set in such a manner that the force for deforming the ring then increases.

In a preferred embodiment, the ring has an asymmetric cross section in the plane which contains the central axis, as a result of which it is possible to set the direction in which the ring is deformed. For example, by means of the asymmetric cross section, it can preferably be ensured that the ring deforms into the recess which can be provided between the ring and the projection. In a preferred embodiment, the projection forms a portion of an additional ring, which is preferably arranged at a distance from the anti-creepage ring and surrounds said anti-creepage ring. As a result, a screw head of the fastener designed as a screw can be surrounded by the additional ring.

Preferably, the ring and the projection are formed integrally with the body. The deformable body can be designed to form a single piece with the ring and the projection. The handling and/or the production can be simplified.

Preferably, the projection is arranged at a greater distance from the central axis than the ring, so that the ring is arranged closer to the hole.

In a preferred embodiment, the hole has a circular cross section in a plane perpendicular to the central axis, so that there is rotational symmetry of the hole, which can simplify the introduction of a fastener having a correspondingly adapted shape.

Preferably, the ring and/or the projection are circular elements, the central axes of which coincide with the central axis of the body, so that the symmetry of the hole is reflected in the symmetry of the ring and/or of the projection. Furthermore, by means of circular elements, a symmetry of the forces occurring can be achieved.

In a preferred embodiment, the ring has an end surface which surrounds the hole and which is arranged in a plane perpendicular to the central axis, and/or the projection comprises a surface which surrounds the hole and which is arranged in a plane perpendicular to the central axis. As a result, a predetermined starting state can be achieved, by means of which the beginning of the application of the fastening force can be defined.

Furthermore, the invention creates a system with a deformable body and an anti-creepage ring, wherein the body has a hole which receives the anti-creepage ring, wherein the hole has a central axis and extends through the deformable body from an end of the deformable body which receives the anti-creepage ring to a distal end of the deformable body, wherein the hole is delimited by the deformable material which forms the deformable body. In the area of the end of the deformable body which receives the anti-creepage ring, the deformable material which surrounds the hole of the deformable body is more resilient, softer or more deformable than the material at some sites of the anti-creepage ring. As a result, it is possible to achieve that the material of the deformable body is more deformable at least in the mentioned area than the material of the anti-creepage ring, so that, in the application of an initial fastening force, a deformation of the deformable body starts first.

The anti-creepage ring can comprise, in particular, a tubular portion which is received by the hole. The anti-creepage ring comprises an extension (a projection) which extends from the tubular portion in a radial direction, wherein the extension is designed to form a single piece with the tubular material made of a material which forms an arc-shaped form as a transition from the tubular portion to the extension, wherein the bendable material of the anti-creepage ring, in a reaction to a force which acts in the direction of the central axis, is stiffer than the material of the deformable body which surrounds the hole of the deformable body in the area of the end of the deformable body which receives the anti-creepage ring, in reaction to a force which acts in the direction of the central axis.

Furthermore, the invention creates a system with a deformable body and with an anti-creepage ring.

In a preferred embodiment, the anti-creepage ring has an extension which extends from the ring in the direction of the projection, so that, during the fastening of the fastener, the anti-creepage ring comes at least partially in contact with the deformable body by means of the extension. In a preferred embodiment, the extension of the anti-creepage ring extends from the ring to the projection of the deformable body, which surrounds the ring. In a preferred embodiment, the ring of the deformable body is in contact with the extension of the anti-creepage ring.

In a preferred embodiment, the anti-creepage ring has a tubular portion which is received by the hole, wherein the extension extends from the tubular portion. During the fastening, particularly during the tightening of the screw, the tubular portion, which can extend through the hole along the central axis of the hole, can be brought in contact with a support part.

In a preferred embodiment, the anti-creepage ring is formed from a metal, as a result of which the anti-creepage ring is stable and high forces can be exerted.

In a preferred embodiment, the system comprises a fastener which extends through the anti-creepage ring and the hole. In particular, the fastener can be designed as a screw.

In a preferred embodiment, the system comprises a support element which has a hole, wherein the deformable body is arranged on the support element, and the fastener extends through the anti-creep ring, the hole in the deformable body, and the hole in the support element and is screwed on the support element by screwing of the fastener into a threading which is provided by means of the hole of the support element, or into a threading of a nut which is arranged on the distal end of the support element. The end of the tubular portion of the anti-creepage ring facing the support element is arranged within the hole of the deformable body and is at a distance from the support element in a first arrangement state of the system, when the fastener is not screwed or is only slightly screwed into the threading. The end of the tubular portion of the anti-creepage ring facing the support element is in contact with the support element in a second arrangement state of the system, when the fastener is screwed farther into the threading, and the deformable material which surrounds the hole of the deformable body in the area of the end of the deformable body which receives the anti-creepage ring has been pressed together.

In a preferred embodiment, the extension of the anti-creepage ring does not come in contact with the projection in the second arrangement state. The extension of the anti-creepage ring is in contact with the deformed ring, and the deformed ring forms an elevation on the projection.

BRIEF DESCRIPTION OF THE SEVERAL VIEWS OF THE DRAWINGS

Below, the invention is explained in further detail in reference to the drawings which show the embodiments of the invention. In the drawings.

DETAILED DESCRIPTION OF THE INVENTION

Figure 1:
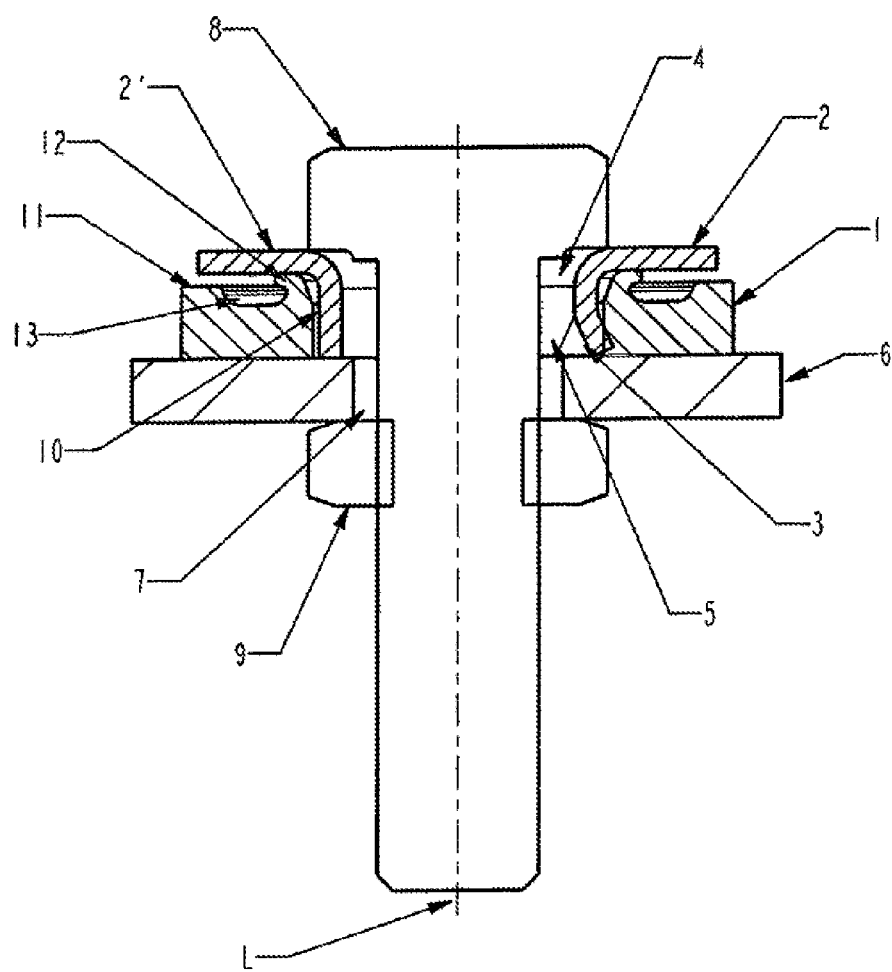
FIG. 1 shows a cross-sectional representation of a system in the fastened state in a first embodiment.

FIG. 1 shows a system with a deformable body 1 and an anti-creepage ring 2, wherein the body 1 has a hole 3 which receives the anti-creepage ring 2, wherein the hole 3 has a central axis L and extends through the deformable body 1 from an end 4 of the deformable body 1 which receives the anti-creepage ring 2 to a distal end 5 of the deformable body 1, wherein the hole 3 is delimited by the deformable material which forms the deformable body 1.

FIG. 1 moreover shows a support element 6 which has a hole 7. The deformable body 1 is arranged on the support element 6, and a fastener 8 extends through the anti-creepage ring 2, the hole 3 in the deformable body 1, and the hole 7 in the support element 6. The fastener 8 designed as a screw is screwed by screwing by means of a nut 9 provided at the distal end of the support element 6.

Figure 2:
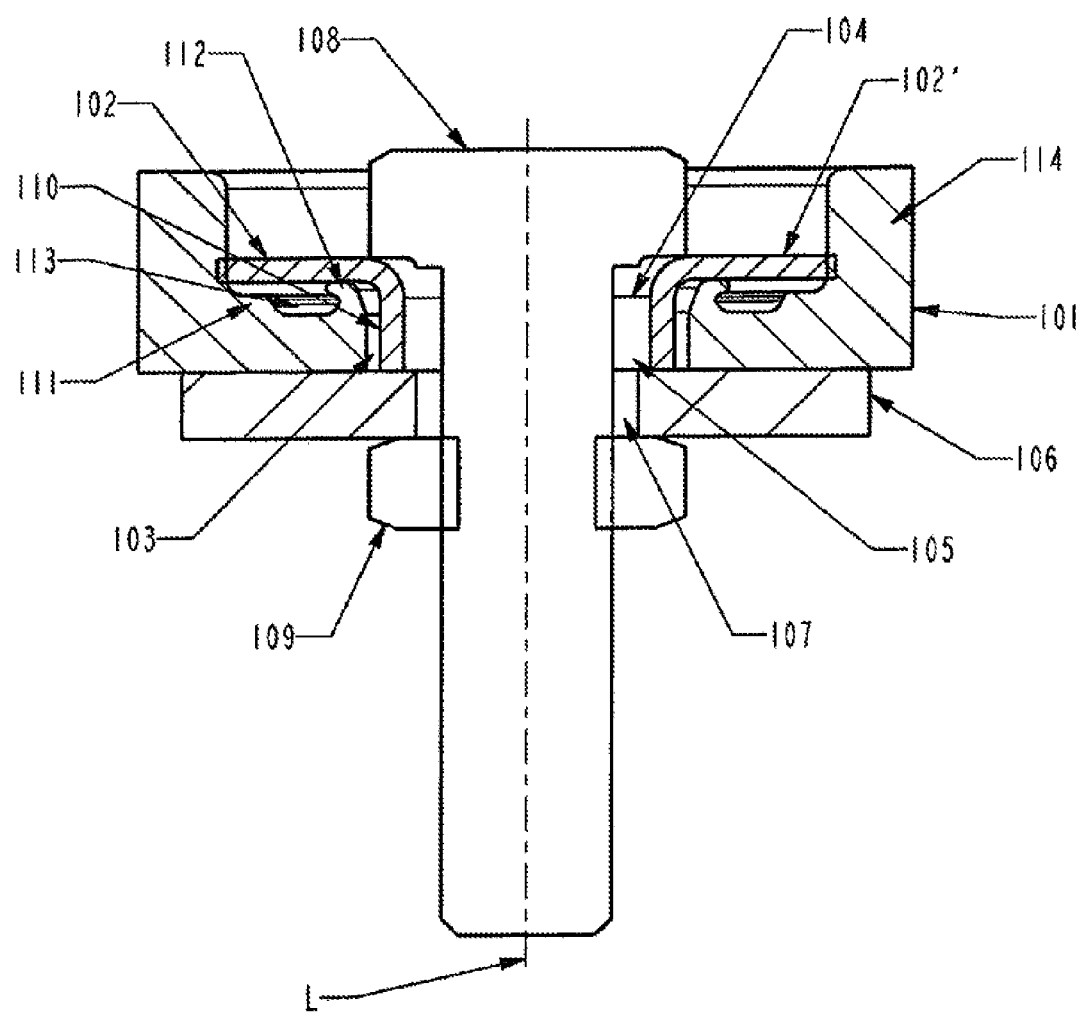
FIG. 2 shows a cross-sectional representation of a system in the fastened state in a second embodiment.

FIG. 1 shows an arrangement state of the system in which the end of a tubular portion 10 of the anti-creepage ring 2 facing the support element 6 is in contact with the support element 6. The extension 2' which extends radially outward from the tubular portion 10 of the anti-creepage ring 2 is in contact with the ring 12 of the deformable body 1. The fastener 8 is screwed into the threading of the nut 9 until the deformable material which surrounds the hole 3 of the deformable body 1 in the area of the end of the deformable body 1 which receives the anti-creepage ring 2 has been pressed together. In particular, the ring 12 of the deformable body 1 has been deformed by screwing of the fastener 8. The ring 12 has been deformed in the direction of a recess 13 formed on the deformable body 1 and it hangs over the recess in the embodiment shown in FIG. 1. In FIG. 1, it can easily be seen that, with slight changes in the geometry of the ring 12 (for example, by making the ring smaller and thus more resilient) and/or slight changes of the material used for the ring 12, an embodiment can be created, in which the tip of the ring 12 is turned into the recess 13. FIG. 2 shows another embodiment of the system. In the other embodiment, elements which functionally resemble elements from the embodiment represented in FIG. 1 are identified with identical reference numerals increased by the value 100. Below, the second embodiment is described essentially with regard to its differences compared to the first embodiment.

In the second embodiment, on the projection 111, an additional ring 114 is formed, which surrounds the anti-creepage ring 102.

Figure 3:
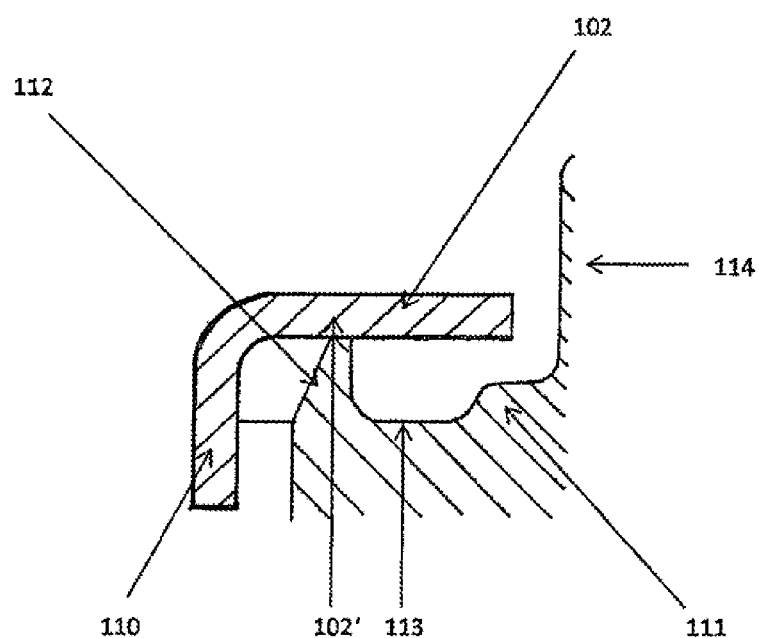
FIG. 3 shows an enlarged representation of an anti-creepage ring and of a deformable body before fastening by a fastener.

FIG. 3 shows an enlarged representation of an anti-creepage ring 102 and of a deformable body 101 before fastening by a fastener 108 according to the second embodiment.

The ring 112 has a tapering cross section in the plane which contains the central axis L. The ring 112 is moreover shaped in such a manner that it has an asymmetric cross section in the plane which contains the central axis L. The two features equip the ring 112 so that it is turned in in the direction of the recess 113 when a longitudinal force acting along the longitudinal axis of the anti-creepage ring 102 is applied.

The invention claimed is:

1. A system with a deformable body formed from a deformable material with a hole which is suitable for receiving an anti-creepage ring and a fastener, wherein the hole has a central axis and the hole is delimited by the deformable material which forms the deformable body, with
   a deformable protruding ring which surrounds the hole and protrudes in a direction of the central axis,
   a first projection which surrounds the hole and is arranged at a distance from the protruding ring in a direction perpendicular to the central axis, wherein the protruding ring protrudes beyond the first projection in the direction of the central axis,
   and an anti-creepage ring,
   wherein the anti-creepage ring has a second projection which extends from the protruding ring in a direction to the first projection, and the anti-creepage ring has a tubular portion which is received by the hole, wherein second the projection extends from the tubular portion,
   wherein the protruding ring is in contact with the second projection, and a recess is provided between the protruding ring and the first projection, so that at least a portion of the protruding ring can be deformed into the recess or onto the recess to or into a position in which it hangs over the recess.

2. The system according to claim 1, wherein the anti-creepage ring is formed from a metal.

3. The system according to claim 1, including a fastener which extends through the anti-creepage ring and the hole.

4. The system according to claim 1, wherein the system includes the fastener extending through the anti-creepage ring and the hole.

5. The system according to claim 4, including a support element which has a hole.

6. The system according to claim 5, wherein the deformable body is arranged on the support element, and the fastener extends through the anti-creepage ring, the hole in the deformable body and the hole in the support element, and is screwed on the support element by screwing of the fastener into a threading which is provided by the hole of the support element or into a threading of a nut which is arranged on a distal end of the support element.

7. The system according to claim 6, wherein an end of the tubular portion of the anti-creepage ring facing the support element is in contact with the support element in a second arrangement state of the system, when the fastener is screwed farther into the threading, and the deformable material which surrounds the hole of the deformable body in the area of the deformable body which receives the anti-creepage ring has been pressed together.

* * * * *